United States Patent

[11] 3,634,061

[72] Inventors Robert W. Geiger;
 Alfred M. Teten, both of Minneapolis;
 William G. Paterson, Roseville, all of Minn.
[21] Appl. No. 821,161
[22] Filed Apr. 1, 1969
[45] Patented Jan. 11, 1972
[73] Assignee Minnesota Mining and Manufacturing Company
 St. Paul, Minn.

[54] AQUATIC HERBICIDES
 12 Claims, No Drawings
[52] U.S. Cl. .................................................. 71/66
[51] Int. Cl. ............................................. A01n 11/00
[50] Field of Search .......................................... 71/66, 67, 65

[56] References Cited
UNITED STATES PATENTS

| | | | |
|---|---|---|---|
| 2,284,889 | 6/1942 | Fischer.......................... | 71/67 |
| 2,734,028 | 2/1956 | Domogalla................... | 71/67 |

*Primary Examiner*—James O. Thomas, Jr.
*Attorney*—Kinney, Alexander, Sell, Steldt & Delahunt ABSTRACT: Application of a herbicidally effective amount of a substantially insoluble copper-containing compound to areas of water infested with undesirable aquatic plants so that the compound comes into contact with the plants and is held thereby, destroys said plants with minimal pollution of the water and toxicity to other forms of aquatic life.

AQUATIC HERBICIDES

BACKGROUND OF THE INVENTION

The invention relates to the use of substantially insoluble copper-containing compounds, especially malachite, scientifically named basic copper carbonate, in the control of *Chara vulgaris*, filamentous algae, and other aquatic plants.

Inland waters have become quite important as they are used for recreation, irrigation, fire protection, livestock, fish production, and many other related uses. These waters are becoming more subject to pollution with the growth of population, and thus, aquatic plant growth has become a serious problem. Especially troublesome plants are *Chara vulgaris*, filamentous algae, and vascular plants such as *Ceratophyllum demersum*, *Elodea canadensis*, and *Najas guadalupensis*.

Chara is a green alga having a skunk or garlic odor and a rather slick taste. Closely related to Chara, and as troublesome, is an algae called Nitella having a green color, a grassy odor and a bitter taste. Representative filamentous algae are Spirogyra, Zygnema, Oedogonium, Pithophora, and Cladophora. Not only are these algae noted for their odor and taste but they also cause slime, discoloration of water and corrosion of metal and concrete.

These unsightly, obnoxious plants grow both beneath and on the surface of the water. The algae have been troublesome to boaters, fishermen, and swimmers, are very unattractive in residential areas and create health hazards by infesting portable water supplies. Further, certain phankton algae in the water can be toxic to people or animals that come in contact with it by swimming in or drinking the water. Examples of other toxic algae are Anabaena and Aphanizomenon.

Various attempts have been made to subdue the growth of aquatic plants, especially algae, or destroy them. A compound commonly used at the present time is soluble copper sulfate. Copper sulfate, however, does not control aquatic plants to the extent desired. The compound is ineffective in controlling many aquatic plants such as *Chara vulgaris*, Cladophora and Nitella. To obtain effective control of some aquatic plants using copper sulfate, as well as other aquatic herbicides used presently, large amounts must be used to raise the copper concentration of the entire body of water to an effective dosage rate. At this effective dosage rate, with such large amounts being required, these compounds are generally toxic to desirable aquatic life such as fish and certain plants, particularly in soft water. Further, these compounds may be toxic or hazardous to the applicator and there is a large amount of water pollution resulting from their use. It has also been found that water-soluble compounds such as copper sulfate and alkaline algicides such as sodium arsenite and long chain alkylamine salts of endothall tend to be corrosive to pumping and spraying equipment used in applying the compounds to the infested water.

SUMMARY OF THE INVENTION

According to the present invention, undesirable aquatic plants are destroyed by application of a herbicidally effective amount of a substantially insoluble copper-containing compound to the locus that is infested with these plants in a manner so that the compound comes in direct contact with the plants and rests on the plant surface or is held thereby.

Among the many substantially insoluble copper-containing compounds which have been found useful, the preferred are basic copper (II) carbonate, copper (II) bicarbonate, copper (I) oxide, copper (II) benzoate, copper (II) hydroxide, copper (II) oxide, copper (I) thiocyanate, copper (I) azide and copper (II) azide. Copper azide is considered explosive but if kept wet in a slurry, is safe for use. Basic copper (II) carbonate (hereinafter referred to as copper carbonate) is generally preferred as it is easily obtained, inexpensive, and very effectual. This material is essentially 100 percent $CuCO_3 \cdot Cu(OH)_2$ with slight traces of other metals and is commonly called malachite. Where the material is $2CuCO_3 \cdot Cu(OH)_2$ it is commonly called azurite and may also be used. Although the compound has been used for the control of terrestrial fungi and, in conjunction with other materials, for the control of "swimmers itch," by controlling snails carrying the infection-producing parasite, to applicants' knowledge insoluble copper- containing compounds have never been used to control aquatic plants as described herein. In fact, hydrobiologists have stated that it is the formation of insoluble copper carbonate in the alkaline water that renders copper sulfate unusable in some cases as an algicide. See, for example, Domogalla et al., "15 Years of Algae Control," U.S. Trout News, March-April, 1963, pg. 8. It has been stated also, according to the above reference that the heavy copper carbonate precipitate in the water would be toxic to fish and also reduce fish food organisms in the bottom muds. Although the insoluble character of the compounds used in this invention suggests that they would be poor aquatic herbicides, it was found that the insoluble copper-containing compounds effectively controlled undesirable aquatic plants without having an adverse effect upon fish and other aquatic life.

The use of relatively insoluble copper compounds has proven to be nontoxic to desirable aquatic life and yet destructive to undesirable plants primarily because of the mechanism by which the compounds work. The copper-containing compounds, such as malachite, are in the form of wettable powders.

Compounds not inherently wettable may be made so by the addition of a wetting agent such as sodium dioctylsulfosuccinate. Other inert ingredients may also be added to modify the aquatic herbicide, these modifications being well known in the art. For example, for certain compounds it may be desirable to include a dust inhibitor such as glycerine.

When mixed with water, the slurry is sprayed on the surface of the water only in the area of infestation rather than underwater and, upon solubilizing, permeating the entire area, the latter being recommended for soluble algicides. As the compound settles through the water, it settles on or "clings" to the plant. At this point there is a very slow dissolution of copper ions into the previously copper-free area at the plant surface. As a small amount of copper ion is released, it is absorbed by the plant thus causing additional copper ions to be slowly released. This type of reaction is best described as the Le Chatelier principle of equilibrium. In accordance with that principle, the absorption of the copper by the plant creates a pressure on one side of the reaction which upsets the solubility equilibrium. Taking the copper ions out of solution by the plant causes the release of more copper ions into that area which in turn are absorbed causing the release of again more copper ions. This controlled release requires that only a *small amount* of the slightly soluble copper-containing compound need be used and demonstrates the importance of the copper compound being substantially insoluble. High concentrations of the copper ion need not be used and, therefore, do not exist in areas other than at the plant surface where the copper is absorbed. As a result, toxic effects on desirable organisms in the surrounding area are avoided.

Due to the low solubility of the copper-containing compounds of this invention, which is below 50 mg. per liter, and to the resulting lower dosage required for control, the water is less polluted than when using algicides known in the prior art. This is an especially desirable result when the compounds are used in reservoirs which supply the water for a city. Other advantages are that the algae control may be localized to the treated area only and the compound does not lose its toxicant through absorption by bottom muds as do granular formulations employing soluble materials. The compounds of this invention are highly effective under a wide variety of aquatic conditions. The material is effective in water over a wide range of temperatures. It is further effective under varying conditions such as water clarity, hardness, total alkalinity, pH, and other parameters and is effective at essentially all growth stages of Chara and filamentous algae. Further, the material is noncorrosive to pumping equipment and mixing tanks and is safer to the applicator than soluble copper-containing compounds.

The substantially insoluble copper-containing compounds useful in the present invention, as heretofore described, have a solubility in pure water up to about 50 mg. per liter, on the basis of dissolved copper ion. The preferred solubility range for these compounds is from about 0.001 to 1.0 mg. per liter copper ion which is a safe range for desirable aquatic life. Copper compounds with a solubility greater than 50 mg. per liter will probably dissolve before they reach the plant sought to be destroyed. An early solubilization of these compounds results in effects as those observed with copper sulfate and obviates those advantages described with using insoluble copper compounds having localized activity at the plant surface, such as reduced toxicity to fish, reduced pollution and the use of small amounts. The compounds should be in a finely divided form so that intimate contact can be made with the undesirable plant and increase the efficacy of the absorption of the copper by the plant. For the purposes of the invention, the copper compounds are ground to about 0.01 to 1,000 microns in diameter, and 0.1 to 100 microns is preferred. Granular material sinks to the bottom and would not be desirable for the purposes of the invention.

The substantially insoluble copper compounds of the present invention have crystalline densities of well in excess of the density of water so that these materials will settle readily therein. The sedimentation characteristics of these compounds were determined by dispersing 5 g. of the material in 45 g. of water and pouring the slurry into a 3¾-inch diameter tube which has a 65½-inch column of water from the surface to the monitoring section. A light source and photomultiplier tube were used to count the particles as they passed the monitoring section. Sedimentation was the greatest in about 8 minutes and most of the material settled 20 minutes after application. Results indicate that most of the particles settle on the plant surface in 8 to 20 minutes and are not dispersed throughout a large area. This is important as only the amount of copper that is required to control algae in a given area is needed rather than saturating a whole lake or pond with the material. Toxicity to desirable species is minimal and cost greatly reduced.

Water solubility of the copper compounds of the present invention was determined by adding them to 1-gallon water samples in amounts such that the copper concentration would be 5 mg. per liter if all the material dissolved. For example, when testing malachite, the water samples were stirred for four hours and then analyzed for copper. The copper content in distilled water was 0.007 mg. per liter while in distilled water with the malachite included, it was 0.020 mg. per liter. Similarly the copper content of ordinary like water was 0.030 parts per million while lake water with malachite has a copper content of 0.090 parts per million. These results indicate that the malachite or basic copper carbonate is substantially insoluble in distilled water or lake water thus offering a large margin of safety to other marine life.

The compound may be used in a range of one-half to 400 pounds per acre but preferably something less than 5 to 20 pounds per acre is used. For algae, 0.025 to 5 parts copper per million parts water may be used in treatment, about 0.05 to 1.0 parts per million being preferred. For vascular plants such as Ceratophyllum, from about 0.05 to 20.0 parts per million may be used. These levels represent total copper. However, the amount in solution is always much less than the total amount added because of the insoluble nature of the compounds. It is desirable to use as little copper-containing compound as possible because of the toxicity problems previously noted, although toxicity is substantially reduced with such compounds. Localized treatment in accordance with this invention allows destruction of unwanted aquatic plants with very small concentrations of copper.

The following nonlimiting examples will serve to further illustrate the invention.

EXAMPLE I

A square 1.0-acre test plot was marked off with stakes near the shore of a lake which was infested with Chara (*Chara vulgaris*) and filamentous algae. The lake bottom was silt. Five pounds of finely divided (about 100 microns) basic copper carbonate were mixed with 30 gallons of water and the resulting slurry was sprayed uniformly over the surface of the test plot by means of a mechanical sprayer. The particles of basic copper carbonate settled through the water and came to rest on the Chara and filamentous algae. The water temperature was 72° F. Within 10 days, an obvious condition of chlorosis (green plants lose their color and usually become yellow) was apparent in the Chara and the filamentous algae had disintegrated. The Chara had a moribund appearance and gradually disappeared from the test area over the next several weeks. The Chara and algae in the areas surrounding the test plot remained green and healthy.

EXAMPLE II

A 35-foot perimeter of a small lake was treated at a dosage rate of 20 pounds per acre of similarly divided basic copper carbonate. The treated area amounted to 2.3 acres and was very heavily infested with a lush growth of Chara and filamentous algae. The lake had a sandy bottom and was subject to a slight waterflow from canals at opposite ends of the lake. The canals led to adjacent lakes which were part of an extensive system of fresh water lakes and canals. The adjacent lakes were similarly infested. The lake perimeter was treated in several stages by mixing the 6.5 pounds of basic copper carbonate with 100 gallons water in a 150-gallon fiber glass tank equipped with a mechanical agitator. The resulting green slurry was sprayed uniformly over the surface of the treated area. The water temperature was 82° F. Within a week following treatment, the treated vegetation acquired a pale and sickly appearance, and it gradually disintegrated and disappeared from the treated area. Virtually complete control of Chara was observed after 3 months. The adjacent lakes remained infested.

The average water depth in the treated area was 4 feet, so that the amount of copper in the treated area was the same as it it were treated with 4 p.p.m. copper sulfate pentahydrate (equivalent to 1 p.p.m. copper ion). In the present example, however, the basic copper carbonate is very sparingly soluble in water, and there is an extremely low level (about 0.02 p.p.m.) of copper ion present in the water. The present method of treatment offers a big margin of safety to fish compared with treatments using soluble copper compounds.

EXAMPLE III

In a lake infested with Chara (*Chara vulgaris*), Nitella (*Nitella spp.*) and filamentous algae, an area measuring 375 feet along the shore by 100 feet out into the lake (0.85 acre) was treated as described in the previous examples with basic copper carbonate at a dosage rate of 12 pounds per acre. Within six days after treatment, the vegetation in the treated area had become colorless and mushy and in another 12 days the area was essentially free of vegetation. The control lasted at least 5 months, at which time the onset of cold weather made further observations meaningless. During the field trial, the areas surrounding the test plot remained infested with Chara, Nitella, and other forms of algae.

Further examples are set out in the following table wherein basic copper carbonate was used as the algicide.

| Example No. | Body of water | Shoreline type and lake bottom | Cloud cover-wind, water temperature, water clarity | Plot size, depth | Dosage rate, lbs./a. | Weeds or algae in test | Weed control data | |
|---|---|---|---|---|---|---|---|---|
| | | | | | | | Number of days | Percent control |
| IV | Lake | Residential | 0–25%; calm; above 70° F.; clear | 0.85 a., 4 ft | 12 | Chara vulgaris | 12 | 100 |
| | | | | | | Filamentous algae | 12 | 100 |

| Example No. | Body of water | Shoreline type and lake bottom | Cloud cover-wind, water temperature, water clarity | Plot size, depth | Dosage rate, lbs./a. | Weeds or algae in test | Weed control data | |
|---|---|---|---|---|---|---|---|---|
| | | | | | | | Number of days | Percent control |
| V | Lake | Residential; sand, gravel. | 0-25%; calm; above 70° F.; clear | 2.3 a., 4 ft | 20 | Chara vulgaris | 14 | 75 |
| | | | | | | | 35 | 90 |
| | | | | | | | 60 | 98 |
| | | | | | | Filamentous algae | 14 | 100 |
| | | | | | | | 60 | 100 |
| VI | Lake | Residential; sand, gravel, rock. | 25-75%; 0-19 M.P.H.; 66°F.; turbid | 1 a., 4.5 ft | 30 | Chara vulgaris | 25 | 90 |
| | | | | | 10 | Chara vulgaris | 25 | 75 |
| | | | | | 20 | Chara vulgaris | 25 | 80 |
| | | | | | 40 | Chara vulgaris | 25 | 80 |
| VII | Lake | Forest silt | 25-75%; 5-10 M.P.H.; 68° F.; clear | 1 a., 5 ft | 30 | Chara vulgaris | 28 | 80 |
| | | | | | 7.5 | Chara vulgaris | 28 | 50 |
| VIII | Lake | Forest silt | 0-25%; 5-10 M.P.H.; 65° F.; clear | 1 a., 5 ft | 15 | Chara vulgaris | 27 | 100 |
| | | | | | 30 | Chara vulgaris | 27 | 100 |
| IX | Lake | Forest silt | | 2.3 a., 4-5 ft | 15 | Chara vulgaris | 27 | 90 |
| | | | | | 20 | Chara vulgaris | 32 | 100 |

EXAMPLE X

Duplicate samples of Coontail (*Ceratophyllum demersum*) which were growing vigorously in 1-gallon jars filled with water were treated by adding to the jars an aqueous slurry containing 0.007 grams of basic copper carbonate which is equivalent to a copper concentration of 1.0 part per million if all of the material would have dissolved. Some discoloration of the plant was obvious within 12 hours and there was extensive defoliation within 24 hours. Five days after treatment the stems had separated from the nodes an extensive discoloration of the plants was obvious. An untreated control plant showed new growth during the same period.

EXAMPLE XI

Using the procedures of example I, essentially similar results are obtained by using copper (II) azide in place of basic copper carbonate.

EXAMPLE XII

A small oval 0.6 acre pond, which was infested with a growth of *Chara vulgaris* and filamentous algae, was treated as described in previous examples with 1.2 lbs. of powdered copper (I) oxide which has been premixed with 10 gal. of water. The average depth of the pond was 2.5 feet, so that the dosage of copper (I) oxide was equivalent to a copper concentration in the water of 0.25 p.p.m. if all the material would have dissolved. When the pond was inspected 14 days following treatment, extensive discoloration of the Chara was apparent and the filamentous algae had largely disintegrated. Both algae gradually disappeared during the next several weeks.

EXAMPLE XIII

A rectangular test area, approximately 100 feet wide by 400 feet long with an average depth of 3.5 feet, was marked off with stakes along the shore of a very large pond which was infested with a growth of *Ceratophyllum demersum*, *Hydrilla verticillata*, and filamentous algae. An aqueous suspension containing 40 pounds of copper (II) hydroxide in 40 gal. water was sprayed evenly over the surface of the staked area. The particles of copper (II) hydroxide settled through the water and came to rest on the weeds and algae. A general condition of chlorosis was apparent in all the treated plants within three days of the herbicide application, and the weeds and algae gradually disintegrated and disappeared during the next several weeks. The weeds and algae in the areas surrounding the trial area remained in a healthy condition.

What is claimed is:

1. A method of destroying undesirable aquatic plants in lakes, ponds, waterways, and the like, comprising applying only to the area infested with said plants, an herbicidally effective amount of a substantially insoluble copper-containing compound selected from the group consisting of copper (II) carbonate, copper (I) oxide, copper (II) oxide, copper (II) benzoate, copper (II) bicarbonate, copper (II) hydroxide, copper (I) azide, and copper (II) azide, said compound being in particulate form and only being effective when the particles contact said plants, said method substantially reducing the amount of copper compound in the surrounding aquatic environment thereby greatly minimizing the destruction of desirable aquatic life.

2. A method as recited in claim 1 wherein said copper-containing compound is basic copper (II) carbonate.

3. A method as recited in claim 1 wherein said copper-containing compound is copper (I) oxide.

4. A method as recited in claim 1 wherein said copper-containing compound is copper (II) oxide.

5. A method as recited in claim 1 wherein said copper-containing compound is copper (II) benzoate.

6. A method as recited in claim 1 wherein said copper-containing compound is copper (II) bicarbonate.

7. A method as recited in claim 1 wherein said copper-containing compound is copper (II) hydroxide.

8. A method as recited in claim 1 wherein said copper-containing compound is copper (I) azide.

9. A method as recited in claim 1 wherein said copper-containing compound is copper (II) azide.

10. A method of destroying undesirable aquatic plants comprising treating water containing such plants with a herbicidally effective amount of malachite having from 55.3 to 56.1 percent by weight of copper, whereby said malachite settles through the water and rests on the plant, said malachite being substantially insoluble in water so that said copper goes into solution at the surface of the algae and is rapidly absorbed thereby.

11. A method as recited in claim 10 wherein said herbicidally effective amount is from 1 to 40 pounds of said malachite per acre.

12. A method as recited in claim 1 wherein said copper-containing compound has a solubility in water of from about 0.001 to 100 parts per million.